United States Patent Office 3,039,229
Patented June 19, 1962

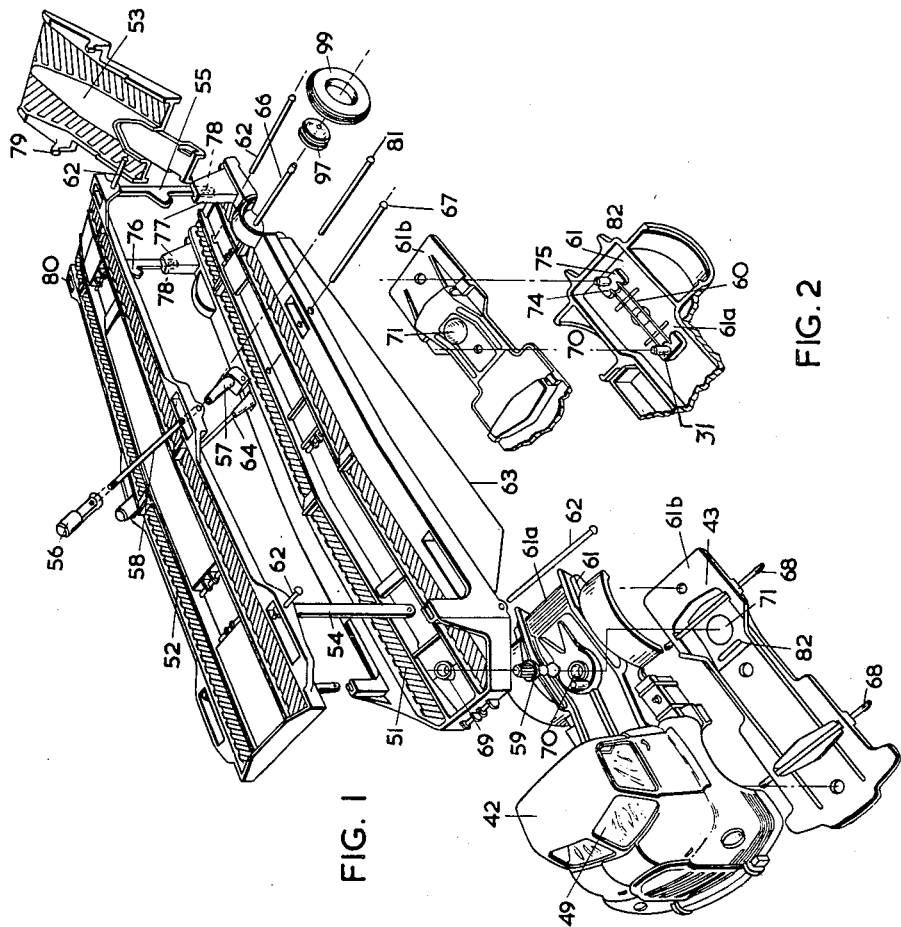

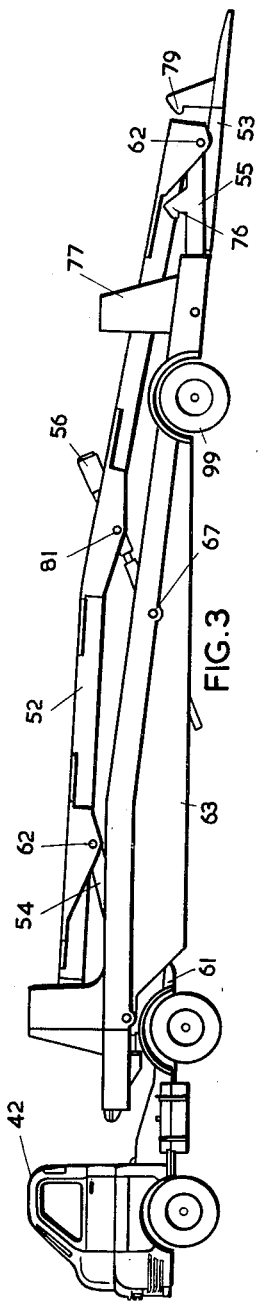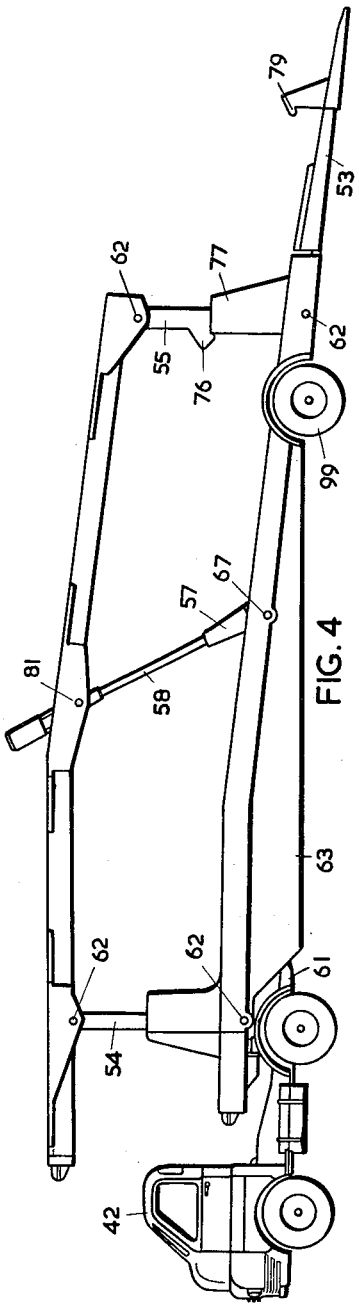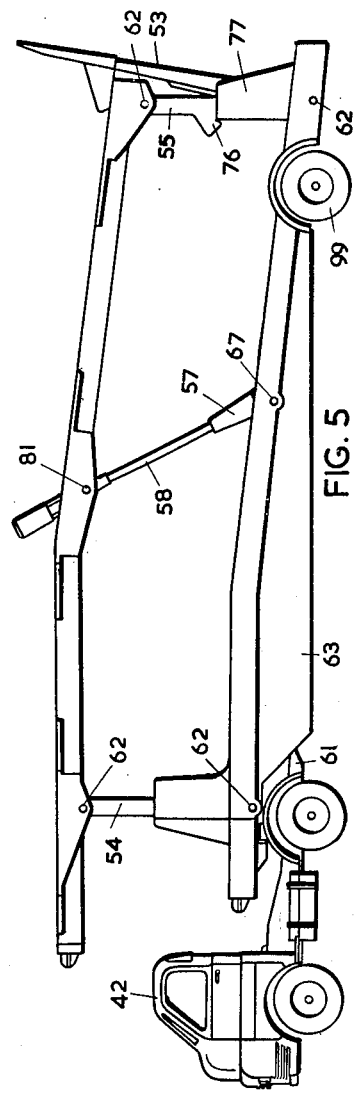

---

3,039,229
TOY CAR TRANSPORT VEHICLE
Marcel Rene Van Cleemput, Northampton, England, assignor to The Mettoy Company Limited, Northampton, England, a British company
Filed May 19, 1958, Ser. No. 736,201
Claims priority, application Great Britain May 17, 1957
1 Claim. (Cl. 46—201)

This invention relates to a toy vehicle simulating a car transporter vehicle.

The toy vehicle of the invention resembles the full scale car transporter vehicle in having upper and lower decks each adapted to carry other vehicles, the decks being connected together by hanged links, so that the upper deck is moveable between a lowered position in which it rests directly on the lower deck and a raised position in which it is held spaced above the lower deck by the links. The toy vehicle of the invention is provided with a flap hinged to the rear end of the lower deck so as to be moveable between a downwardly sloping position in which it forms a ramp for loading vehicles either onto the upper deck (when that deck is lowered) or onto the lower deck (when the upper deck is raised), and a substantially vertical position in which it forms a barrier at the rear ends of both decks.

A preferred arrangement of a model car transporter vehicle according to the invention will now be described by way of example only, reference being made to the accompanying drawings, in which:

FIGURE 1 is an exploded view of the model car transporter vehicle;

FIGURE 2 is an exploded view of the underneath of certain parts only of the vehicle;

FIGURES 3, 4 and 5 are side elevations of the vehicle with the parts in three different positions.

Referring to the drawings, the model car transporter vehicle shown comprises a towing truck or tractor vehicle 42 and a trailer vehicle 63 which are detachably coupled together by means of a vertical pivot, formed by a peg 59 projecting downwardly from the trailer and fitting into an aperture 70 in the tractor. This pivotal connection is described in more detail below. The trailer comprises a bottom frame or lower deck 51, and a top frame or upper deck 52, which is supported from the bottom frame by a pair of front links 54 and a pair of rear links 55, the links being pivotally connected to both top and bottom frames by means of pins 62. The bottom rear pin 62 also serves to support pivotally a flap 53, which can be moved from a substantially vertical position (FIGURE 5), in which it forms a back stop or barrier at the rear ends of both the decks 51, 52, to a downwardly sloping position (FIGURES 3 and 4), in which it forms a ramp for running smaller toy vehicles to be transported onto either of the decks. Axles 66 and 68 are provided for the trailer and tractor vehicles respectively, road wheels (formed by hubs 97 and tires 99) being mounted on each end of each axle.

The upper part of the coupling peg 59 is splined and fixedly secured in an aperture 69 provided in the bottom frame 51. The lower end of the coupling peg 59 is rounded to form a ball, above which is a narrow neck situated between the ball and the upper part of the peg. When the trailer is coupled to the tractor, the lower end of peg 59 passes through the aperture 70 in the truck chassis, and engages between a pair of parallel resilient wires 60 secured to the tractor (see FIGURE 2). The chassis 61 of the tractor is formed by an upper part 61a and a lower part 61b, secured together by rivets 31. The ends of the two wires 60 are housed in slots 74 provided in projections 75 integral with the chassis part 61a. The wires are held spaced intermediate the two chassis parts when the latter are secured together by stand-off projections 82. The central portions of the two wires 60 can easily be forced apart by the ball of the coupling peg, but they return resiliently to engage closely around the narrow neck of peg 59 and hold the tractor and trailer pivotally connected. Uncoupling is effected by simply forcing out the ball between the resilient wires. Other trailer vehicles having like coupling pegs can alternatively be coupled with the same tractor if desired.

Each of the links 54, 55 is partly enclosed by a box-like support 77, open at the top and rear, which projects upwardly from the bottom frame 51. Each of the rear links 55 is provided with an integral hooked catch 76, which engages the corresponding support 77 when the top platform 52 is moved to its raised position and prevents the inadvertent lowering of the platform. Slots 78 are provided in the bottom end of the rear links 55 to receive the bottom rear pivot pin 62, thus allowing sufficient vertical movement of the catches 76 for these to be engaged with the supports 77 and disengaged from them when lowering the upper deck. The flap 53 is similarly provided with a pair of hooked catches 79 for engaging a pair of recesses 80 in the top frame and securing the flap in a raised position and has an elongated slot engaged round the pivot pin 62 to allow the necessary vertical movement.

The upper and lower decks of the trailer are additionally interconnected by a pair of devices 64 which simulate the hydraulic jacks used in the full scale transported vehicle for raising the upper deck. Each of these devices consists of a rod 58 secured at its upper end to an enlarged head 56 which is pivotally secured to the top frame by a pin 81. The rod 58 slides in a bore provided in a sleeve 57, which is pivotally connected to the lower frame by a pin 67.

When the flap 53 and the upper deck 52 are lowered, as shown in FIGURE 3, smaller top vehicles can be rolled up the ramp formed by the sloping flat onto the upper deck. The upper deck with its load can then be raised, the links 54, 55 swinging about the pivot pins 62 into substantially vertical positions. Towards the end of this movement, the sloping lower edges of hooked catches 76 on the rear links 55 engage the upper edges of the supports 77, lifting the rear end of the upper deck sufficiently to engage the hooks over the supports 77 and retain the upper deck in raised position, as shown in FIGURE 4. With the parts in this position, further toy vehicles can be rolled up the ramp 53 onto the lower deck 51. The flap constituting the ramp can then be swung up into the position shown in FIGURE 5, its hooked catches 79 engaging the recesses 80 in the same way as the catches 76 engaged the supports 77. In this position the flap 53 forms a barrier at the rear end of both decks, preventing accidental displacement of the vehicles carried on the decks.

I claim:

A toy comprising a tractor vehicle supported on wheels and a trailer vehicle supported at its rear end upon wheels and at its front end upon the tractor vehicle, the vehicles being pivotally and detachably connected together by a peg projecting downwardly from the trailer vehicle and engaging rotatably into an aperture in the tractor vehicle, the peg having a rounded lower end above which is a narrow neck, while the tractor vehicle carries below the said aperture, a pair of parallel resilient wires which can be forced apart by the lower end of the peg and will then engage around the neck of the peg.

References Cited in the file of this patent

UNITED STATES PATENTS

| | | |
|---|---|---|
| 1,175,046 | Byron | Mar. 14, 1916 |
| 1,183,313 | Martin | May 16, 1916 |
| 1,272,486 | McManis | July 16, 1918 |
| 1,427,189 | Bourgeois | Aug. 29, 1922 |
| 2,475,878 | Clark et al. | July 12, 1949 |
| 2,641,124 | Gallagher et al. | June 9, 1953 |
| 2,797,960 | Endres et al. | July 2, 1957 |

FOREIGN PATENTS

| | | |
|---|---|---|
| 488,772 | Great Britain | July 13, 1938 |
| 653,712 | Great Britain | May 23, 1951 |
| 872,317 | Germany | Apr. 27, 1953 |
| 711,290 | Great Britain | June 30, 1954 |

OTHER REFERENCES

Hausser, German application, Serial No. H15370, printed November 24, 1955 (Kl. 77f1609).